United States Patent
Venkataraman et al.

[11] Patent Number: 5,885,494
[45] Date of Patent: *Mar. 23, 1999

[54] METHOD OF FORMING FOAMED FLUOROPOLYMER COMPOSITES

[75] Inventors: Sundar Kilnagar Venkataraman, Vienna, W. Va.; Stuart Karl Randa; Peter Dwight Spohn, both of Wilmington, Del.

[73] Assignee: E. I. du Pont de Nemours and Company, Wilmington, Del.

Related U.S. Application Data

[60] Provisional application No. 60/018,093 May 22, 1996.

[21] Appl. No.: 852,463
[22] Filed: May 7, 1997
[51] Int. Cl.[6] .............................. B29C 44/06; B29C 44/12
[52] U.S. Cl. ...................... 264/46.5; 264/46.4; 264/46.6; 264/46.9; 264/50; 156/79
[58] Field of Search ............................ 264/50, 46.4, 46.5, 264/46.9, 46.6; 156/79

[56] References Cited

U.S. PATENT DOCUMENTS

| | | | |
|---|---|---|---|
| 4,711,811 | 12/1987 | Randa | 428/383 |
| 4,716,073 | 12/1987 | Randa | 428/215 |
| 4,764,538 | 8/1988 | Buckmaster et al. | 521/85 |
| 5,023,279 | 6/1991 | Buckmaster et al. | 521/85 |
| 5,227,103 | 7/1993 | Muschiatti | 264/46.4 |
| 5,514,759 | 5/1996 | De Simone et al. | 526/89 |
| 5,530,049 | 6/1996 | Dee et al. | 524/424 |

*Primary Examiner*—Allan R. Kuhns

[57] ABSTRACT

Fluoropolymer is advantageously foamed by first forming a composite structure of a layer of the fluoropolymer to be foamed and a layer of different material such as a different fluoropolymer not to be foamed, followed by heating the composite structure to the foamable state for the layer of fluoropolymer to be foamed, pressurizing the heated composite structure with supercritical carbon dioxide, rapidly depressurizing the heated composite structure, whereby the foamable layer foams and the other layer foams less or not at all, and cooling the foamed composite structure.

10 Claims, 1 Drawing Sheet

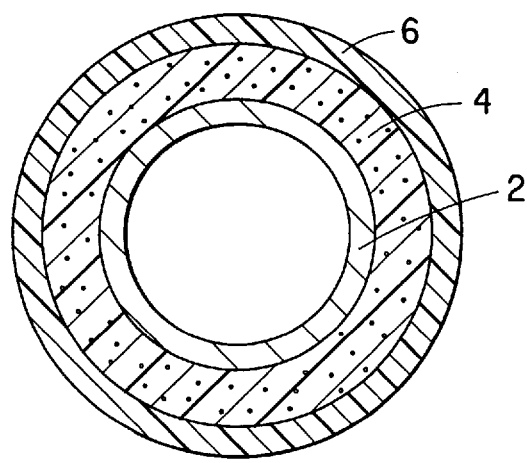
FIGURE

METHOD OF FORMING FOAMED FLUOROPOLYMER COMPOSITES

CROSS-REFERENCE TO RELATED APPLICATION

This is application claims the benefit of U.S. Provisional Application No. 60/018,093, filed May 22, 1996.

FIELD OF INVENTION

This invention relates to the foaming of fluoropolymers in composite structures.

BACKGROUND OF THE INVENTION

Composite wire insulation has been made by coextruding melt-fabricable fluoropolymer coating onto wire, which coating is foamed as it leaves the extruder, and a solid fluoropolymer skin onto the foaming coating, such as disclosed in U.S. Pat. Nos. 4,711,811 and 4,716,073. The presence of the foaming during the extrusion and the coming together of the coextruded fluoropolymers makes it difficult to control the thicknesses of the two layers forming the wire insulation, which is especially important as the thickness of these two layers is decreased to provide smaller diameter insulated wire. In addition, the adhesion between the layers (foam and skin) suffers from the foaming action occurring as the adhesion between the layers is forming.

Foamed tubing, i.e. tubing with a foamed sidewall, is desirable for forming more flexible and/or lightweight tubing, but it is very difficult to make foamed tubing because there is no center wire to support the tubing during solidification from the molten extrudate. Moreover, the foaming of the molten extrudate reduces melt strength, furthering the tendency of the tubing to sag and deform, especially as the wall thickness and/or diameter of the tubing increases.

There is a need for the ability to form foamed fluoropolymer structures which do not have the foregoing problems.

SUMMARY OF THE INVENTION

The present invention satisfies this need by the process for foaming a composite structure comprising a layer of first fluoropolymer and a substrate in contact with said layer, said layer of first fluoropolymer being solid, said first fluoropolymer being foamable at a temperature at which said substrate is either less foamable or is non-foamable, said process comprising (a) heating said composite structure to a foamable state for said first fluoropolymer, (b) pressurizing the heated composite structure with supercritical carbon dioxide, (c) depressurizing the pressurized heated composite structure while said first fluoropolymer is still in the foamable state, whereby said carbon dioxide foams said layer of said first fluoropolymer, and (d) cooling said foamed composite structure.

Steps (a) and (b) can be carried out in the sequence given or in reverse sequence or simultaneously. The heating step is carried out so that the layer of second fluoropolymer foams to a lesser extent (lower void content) or not at all. Preferably the composite structure is flexible and the substrate and layer of first fluoropolymer are adhered to one another such that when the structure is flexed, the layer and substrate remain attached to one another. The term "substrate" means a material having a surface which is in contact with or adhered to the layer of first fluoropolymer and does not require the fluoropolymer to be formed on the substrate or the substrate to be a support for the layer. The layer and substrate can be formed simultaneously, such as by coextrusion as will be disclosed later herein, and the layer of first fluoropolymer can have substantially greater thickness than the thickness of the substrate, whereby the layer of first fluoropolymer acts more as a support for the substrate. The substrate material can have a wide variety of identities as will be disclosed later herein, but the preferred material is a fluoropolymer, i.e. a second fluoropolymer, which is different from the first fluoropolymer.

In one embodiment of the process, the composite structure is wire insulation or tubing, which is made by the process of coextruding the first and second fluoropolymers to form solid layers adhering to another. The first fluoropolymer layer can be the inner layer or the outer layer of the insulation or tubing, with the layer of the second fluoropolymer occupying the remaining location. Additional layers can be present.

The process of the present invention is especially advantageous for the manufacture of overbraided insulated wire or tubing, wherein overbraid material, usually of metal wire, is wrapped by braiding on top of the layer of first fluoropolymer forming the outer surface of the insulation or tubing to provide electrical shielding or mechanical and cut-through protection, respectively. In the present practice, wherein a solid layer of fluoropolymer is in contact with the overbraid, when the wire or tubing as the case may be is cut to make electrical connection or for length sizing, the braid tends to slip back from the cut, leaving a portion of the fluoropolymer unprotected. In accordance with one embodiment of the present invention, the solid layer of fluoropolymer in contact with the overbraid is foamed after the overbraiding step, whereby the foamed polymer expands into the overbraid, locking it into place, even when insulated wire or tubing is cut. In another embodiment, the layer of first fluoropolymer at the surface of the wire insulation or tubing is first foamed by the process and then the overbraid is applied, compressing the foam to again lock the overbraid in place.

The process of the present invention is also especially advantageous to the manufacture of tubing by enabling the best extrusion resin to be used. Thus a high viscosity resin as the first fluoropolymer can be used. The layer of second fluoropolymer which foams little or not at all has higher viscosity, to thereby act as a support for the tubing as it is extruded, so that the tubing does not sag or otherwise deform.

Other advantages of the present invention will be disclosed hereinafter.

The pressurization (step (b))of the composite structure with supercritical $CO_2$ is believed to cause the $CO_2$ to dissolve in the fluoropolymer layers making up the composite structure. In the dissolved condition, the fluoropolymer layers and the $CO_2$ form a homogeneous mixture (within each layer), wherein the $CO_2$ is not present as a separate phase within the layers. The depressurization (step (c)) of the composite structure heated to the foamable state of the layer of first fluoropolymer is rapid so that the $CO_2$ comes out of solution in the layers. The foamability of the layer of the first fluoropolymer causes this layer to foam rather than diffuse out of the layer. The relative non-foamability of the layer of second fluoropolymer causes the $CO_2$ to diffuse out of this layer with little or no foaming of it.

The difference in foamability between the layer of first fluoropolymer and the substrate or between the layers of first and second fluoropolymer can be accomplished by the first fluoropolymer being deformable as a result of the heating step (a), while the substrate or second layer is either not deformable under the condition of this heating or is much less deformable.

The deformability of the layer of first fluoropolymer, to give the layer its foamable state is with reference to the action of the $CO_2$ coming out of solution to form cells within the layer as a result of the depressurization step (c). The differential in deformability can be achieved by using a substrate material which is not thermoplastic (melt flowable) under the condition of the process. When the substrate material is also melt-fabricable, the differential deformability and thus foaming vs. non-foaming can be obtained by the layer of second fluoropolymer having a higher melting point than that of the layer of first fluoropolymer, e.g. at least 30° C. higher. Alternatively the viscosity of the second fluoropolymer or any substrate material would preferably be at least 20 Pa.s higher than that of the layer of first fluoropolymer at the temperature of step (a). The melting point or viscosity can be close enough, however, so that the substrate material does undergo some foaming but to a lesser extent than the layer of first fluoropolymer.

Because the $CO_2$ can dissolve in the fluoropolymer layers, it can pass through the outer layer of second fluoropolymer wherein the composite structure is wire insulation, to reach the inner layer of first fluoropolymer. In the case of tubing, the $CO_2$ can reach the layer of first fluoropolymer from the exterior or interior surface. The same is true when other substrate material are used.

BRIEF DESCRIPTION OF THE FIGURE

The Figure shows in enlarged cross-section of one embodiment of composite structure of the present invention after foaming.

DETAILED DESCRIPTION OF THE INVENTION

The fluoropolymers useful in the process of the present invention include the fluoropolymers which are non melt-fabricable and the fluoropolymers which are melt-fabricable. Such fluoropolymers will generally contain at least 35 wt % fluorine. The nonmelt fabricable fluoropolymers generally have a melt viscosity of at least $1 \times 10^8$ Pa.s at 372° C., and the melt-fabricable fluoropolymers will generally have a melt viscosity of $1 \times 10^2$ Pa.s to $1 \times 10^5$ Pa.s as determined from melt flow measurement in accordance with ASTM D 1238 using standard conditions for each resin.

Examples of the non-melt fabricable polymers include the fine powder resin type and granular resin type of polytetrafluoroethylene (PTFE). The fine powder resin is typically made by aqueous dispersion polymerization to yield a dispersion of PTFE particles which is coagulated and dried to form the fine powder resin. This type of PTFE is fibrillatible and is typically processed by blending with a lubricant and paste extrusion of the blend into the shape desired, e.g. wire coating (insulation), tubing, rod, and other beading shapes, and film, followed by sintering. The granular resin type is typically made by suspension polymerization, is not fibrillatible, and is typically fabricated by ram extrusion or cold compaction, followed by sintering. The fabricated article can be in the form of a billet from which articles such as film or tape is skived. The PTFE of either type includes the homopolymer of tetrafluoroethylene (TFE) and modified PTFE, which is a copolymer of TFE with a small amount of at least one other comonomer such that melting temperature is not substantially lower than the homopolymer. The modified PTFE is also non-melt-fabricable. Such comonomers include chlorotrifluorethylene, perfluorobutyl ethylene, perfluoroolefin having from 3 to eight carbon atoms, and perfluoro(alkyl vinyl ether)(PAVE) having from 3 to 8 carbon atoms, with perfluoro(ethyl or propyl vinyl ether) being preferred PAVE comonomers. To the non-melt fabricable modified PTFE, the comonomer content will generally be less than 0.2 mol %.

Examples of melt-fabricable fluoropolymers include (i) homopolymers of chlorotrifluoroethylene (CTFE), and vinylidene fluoride, (ii) copolymers of TFE and a monomer of (i), and (iii) copolymers of at least one of the monomers of (i) or (ii) and at least one monomer selected from the group consisting of ethylene (E), perfluoroolefins having from 3 to 8 carbon atoms, perfluoro(alkyl vinyl ethers), including perfluoro(alkoxy alkyl vinyl ethers) having from 3 to 12 carbon atoms, and perfluoroalkyl ethylene having from 3 to 8 carbon atoms. Especially preferred such fluoropolymers are the tetrafluoroethylene copolymers including TFE/hexafluoropropylene copolymer known as FEP, TFE/perfluoro(methyl, ethyl, or propyl vinyl ether) copolymer, ETFE, ECTFE, and TFE/vinylidene fluoride/hexafluoropropylene copolymer. Additional comonomer may be present in the copolymer, e.g. E/TFE/perfluorobutyl ethylene. Polyvinyl fluoride may also be used. The melt-fabricable fluoropolymers can be crystalline or amorphous.

The first fluoropolymers are chosen from the foregoing described fluoropolymers, and are preferably a melt-fabricable fluoropolymer. The second fluoropolymer can also be chosen from the foregoing described fluoropolymers, matched up with the first fluoropolymer so as to provide the differential deformablity in the practice of the process. Both the first fluoropolymer and the second fluoropolymer can be non-melt fabricable but having different foamability, e.g., modified PTFE will foam more readily than non-modified PTFE. A wide variety of other materials, however, may be used as the substrate material, polymeric and non-polymeric. Examples of other such materials include polyimide, polyamide, and crosslinked polymers, such as crosslinked ETFE or ECTFE, and metals such as steel and aluminum.

Composite structures can comprise these fluoropolymers entirely or these fluoropolymers with other materials as the substrate and can be fabricated by known methods, depending on the fabricability of the particular materials involved. When the structure is composed of a layer of non-melt-fabricable fluoropolymer and a layer of melt-fabricable fluoropolymer, the article of non-melt-fabricable fluoropolymer will be formed separate from the layer of melt-fabricable fluoropolymer. For example, paste extruded tubing of PTFE can be fed into tubing of melt-fabricable fluoropolymer as it is being formed, which applies a layer of the melt-fabricable fluoropolymer on the outer surface of the PTFE tubing. Because the viscosity of the PTFE is so high, the layer of melt-fabricable fluoropolymer is readily foamable in accordance with the process of the present invention, without foaming the PTFE layer. When the substrate material in melt-fabricable, the composite structure can be convienently formed by coextrusion.

Thus composite articles foamed in accordance with the present invention include layers of two different (deformability) fluoropolymers, both being melt-fabricable or one not being melt-fabricable, a layer of first fluoropolymer and a non-fluorinated polymer such as polyimide or nylon, and a layer of the first fluoropolymer and a metal, wherein the fluoropolymer can be either melt-fabricable or non-melt-fabricable. The composite structure may contain additional layer of foamable fluoropolymer or non-foamable material.

Fabrication methods for forming composite structures of melt-fabricable fluoropolymers include extrusion (melt), injection molding, and blow molding, wherein two different fluoropolymers are coextruded, either from an extrusion die or into a mold in the case of injection molding. The layer of fluoropolymer may simply be bonded by known means to subtrate material. Co-paste extrusion of PTFE fine powders may be used to form composite structure of PTFE and modified PTFE, in such form as tubing.

The first and second fluoropolymers of the layers in the composite structure when it is all fluoropolymer are different from one another. In this regard, the fluoropolymers can be made of the same monomers, but have difference in foamability by virtue of different comonomer content and/or molecular weight, and/or one of the fluoropolymers being crosslinked and the other not being crosslinked. More often, the fluoropolymers will be dissimilar in chemical identity, especially if it-is desired that the second fluoropolymer not foam. Typically, the layers of first and second fluoropolymers or other substrate material will be in direct and intimate contact with one another in the composite structure.

Preferred composite structures comprises layers of fluoropolymer in direct contact with one another, wherein one layer is FEP and the other layer is PFA.

The composite structures used in the foaming process of the present invention can be in such forms as wire and cable insulation, tubing, rods or other beading shapes, film, tape and containers. The film and containers can be fabricated for example by blowing processes.

The fluoropolymer resin forming the foamable layer can be in the form of a composition which comprises a foam cell nucleating agent, such as boron nitride as disclosed in U.S. Pat. No. 4,764,538. Along with the boron nitride may be present a thermally stable inorganic salt, also as disclosed in this patent. Examples of inorganic salts include calcium tetraborate, sodium tetraborate, potassium tetraborate, calcium carbonate, zinc tetraborate, and barium nitrate. The concentration of the boron nitride may be 0.5 to 2 wt % if used by itself and 0.05 to 1 wt % if used in conjunction with the salt. Other foam cell nucleating agents can be used in the fluoropolymer composition, e.g. the fluorinated sulfonic and phosphonic acids and salts disclosed in U.S. Pat. No. 5,023,279, such Telomer B sulfonic acid having the formula $F(CF2)_nCH_2CH_2SO_3H$ and salts thereof, wherein n is an integer of 6 to 12, wherein the particular Telomer B is identified by the predominant value of the integer "n", e.g. BaS-10 is the barium salt of the sulfonic acid wherein n=10 as the predominant chain length present. Additional salts include KS-8 (potassium salt of Telomer B wherein n=8 as the predominant chain length) KS-10, BaS-8, and ZrS-10. Such foam cell nucleating agents, when used, will be used in a concentration of 0.005 to 0.8 wt %. The boron nitride and inorganic salt may be used in combination with the fluorinated sulfonic or phosphonic acid or salt thereof. Alternatively, other foam cell nucleating agents can be used, such as talc or metal oxides such as MgO, $Al_2O_3$, and $SiO_2$. The fluorinated sulfonic or phosphonic acid or salt thereof can be used in combination with the thermally stable salt, with no boron nitride being present, as the foam cell nucleating agent. The foam cell nucleating agent produces smaller and more uniform foam cells within the article being foamed by the $CO_2$ in accordance with the process of the present invention. The melt-fabricable fluoropolymers are the preferred fluoropolymers for which foam cell nucleating agent is used.

The process of the present invention is carried out on composite structures comprising the layer of first fluoropolymer and substrate material described above, with the layer of first fluoropolymer being solid, even though foam cell nucleating agent may be present in the fluoropolymer layer. In the case of melt extrusion of the fluoropolymer layer, the extrusion to form the composite structure will be carried out with no blowing agent present. Air may be present in the extruder, entering with the fluoropolymer feed, which may end up as voids in the extruded article, but the void content from this contaminant will be less than 5% and preferably less than 3%, which is considered a solid or unfoamed condition.

In accordance with the process of the invention, the unfoamed composite structure is placed in a pressure vessel. The structure can then be heated, e.g. by heating the pressure vessel, to a temperature at which the layer of foamable fluoropolymer is in the foamable state. Prior to the heating, the $CO_2$ may be introduced, or its introduction may be delayed until the structure has been heated. If introduced when the vessel is cold, the subsequent heating will increase the $CO_2$ pressure within the vessel. The heating and pressurization may be carried out simultaneously or sequentially. In any event, the pressurizing of the article with $CO_2$ above its critical temperature of about 31° C., i.e. supercritical $CO_2$, causes the $CO_2$ to permeate into the composite structure.

The fluoropolymer constituting the foamable layer has a relatively high melting temperature, or in the case of amorphous fluoropolymer, a relatively high softening point, whereby the temperature at which the foamable state will be attained is generally above 200° C. Typically the temperature of the heating step will be within 50° C. of the melting point of the fluoropolymer being foamed. The temperature can be higher than the melting point when the heating is for a relatively short time and the viscosity of the fluoropolymer is high or the shape integrity of the composite structure is maintained by the layer of second fluoropolymer. The temperature used will depend on the particular fluoropolymer present in the foamable layer, and its viscosity, and the time of heating for complete permation of the $CO_2$ into the article. For example, when FEP is the foamable layer, the temperature of heating will generally be from 220° to 250° C., and when PFA is the foamable layer, the temperature of heating will generally be from 280° to 320°, the melting point of these polymers being 260° and 310° C., respectively. PTFE melts at about 327° C. and can be foamed at temperatures such as 310° to 350° C. Melting points referred to herein are determined by standard DSC analysis and also refer to the melting point of the resin in the absence of the $CO_2$.

The $CO_2$ pressure within the vessel will generally reach at least 1070 psi (7.4 MPa), the critical pressure for $CO_2$ and the higher the pressure, the shorter the time at peak temperature for the fluoropolymer layers to be saturated with the $CO_2$. Generally, the pressure will not exceed 6000 psi (41.4 MPa). The thickness of the layers, especially if the $CO_2$ must diffuse through one layer to reach the other will also affect the time and temperature of heating. The particular conditions will be selected so that the desired selective foaming of just one of the layers takes place when the vessel is depressurized, without the composite structure losing its shape, while the one layer is in the foamable state.

Depressurization is preferably carried out rapidly, e.g. by simply venting the $CO_2$, so that the article within the vessel reaches atmospheric pressure in less than 2 minutes. This depressurization while the fluoropolymer of the article is in the foamable condition causes the article to foam, by virtue of the $CO_2$ permeated into the article becoming gaseous to form cells or pores within the article. Since the $CO_2$ is permeated throughout the interior of the article, foaming occurs throughout the interior of the article, or in other words, the foaming of the article within its interior is substantially uniform. The cell size is quite small, e.g. less than 100 to 500 micrometers and cell sizes as small as 2 to 20 micrometers can be obtained as indicated. The foamed structure can be in the form of substantially spherical cells or can be fibrillar, i.e. a three-dimensional network of interconnecting fibrils, with the absence of nodes at the fibril interconnections. The fibrils generally have a length-to diameter ratio of at least 10:1 as determined by measurement of representative fibrils in a scanning electron micrograph of a cross-section of the foamed layer at 10,000× magnification. The foamed structure of articles made from melt-fabricable fluoropolymer can be varied between spherical cells and fibrillar structure by lowering the temperature at which the foaming takes place.

The composite structure, with the layer of first fluoropolymer having been foamed is then cooled to stabilize the foamed shape and foam structure, which can be done by opening the pressure vessel to the atmosphere after depressurization.

The result of the process of the present invention is the preparation of foamed composite structures having a wide variety of shapes and wherein the foamed layer has a void content of generally at least 15% and more often, at least 40%. Normally, in the prior art foaming processes, the smaller the cell size, the smaller the void content. The present invention can provide both small cell size and high void content for the foamed layer of the composite structure, e.g. void content of at least 70% and average cell size of no greater than 20 micrometers.

One of the advantages of the process of the present invention is that the composite structure can be coextruded at a higher production rate, because the coextrusion is not slowed down by the foaming operation. In the case of forming insulation on wire by melt drawdown of the extruded resin onto wire, the melt strength of the resin is weakened by foaming occurring in the melt drawdown region, which requires the extrusion rate to be reduced, even though low melt viscosity resin is used to promote high extrusion rates. In the case of tubing, this product requires vacuum sizing of the outer diameter (OD) of the foamed tubing as made by the conventional extrusion/foaming process. The vacuum sizing tends to collapse and compress the foam, reducing void content. In accordance with the present invention, the tubing is coextruded solid and without any effect on foaming, because the foaming step is delayed until practice of the process of the present invention after the tubing has been vacuum sized. A solid skin of fluoropolymer can be coextruded along with the inner layer of fluoropolymer to be later selectively foamed. The solid skin does not foam and thereby forms a built-in sizer for the outer surface (OD) of the tubing during the foaming process. It is difficult to make the void content at the bottom of the tubing be the same as at the top; gravity tends to make the bottom of the extruded tubing (foamed while extuded) more dense than the top. The present process solves this problem. The process can be operated on individual composite structures or on a plurality of composite structures, such as sized lengths of tubing.

The process of the present invention is especially useful for anchoring overbraid wrapping, used for electrical shielding in the case of wire insulation and for mechanical protection in the case of tubing for fluid handling. The composite structure to be foamed in accordance with the present invention can have the foamable layer as the outer surface of the wire insulation or tubing. The overbraid is applied to the outer surface of the wire insulation or tubing by conventional means. When the overbraid is temperature resistant, it can be applied prior to the foaming process, and the outer layer foams into the braid, locking it in place. Alternatively, the outer layer can be foamed and then the braid wrap applied, somewhat compressing the foamed layer, to lock the overbraid in place. The Figure shows the result by either sequence of operation, wherein a tubing of substrate material forming the inner layer 2 of the tubing is shown. The outer layer 4 has been foamed in accordance with the present invention, and an overbraid wrap 6 is locked into place by the foamed outer layer 4.

EXAMPLES

General procedure—The following general procedure was used unless otherwise indicated. The articles tested were formed by coextrusion of unfoamed tubing of two layers of different fluoropolymers. The extruded tubing had an inner diameter of 6.35 mm and outer diameter of 9 mm. The inner coextruded layer of the tubing was 0.76 mm thick and the outer layer was 0.38 mm thick. For foaming in accordance with the process of the present invention, the tubing was cut into 25.4 mm lengths. The pressure vessel was made of Monel corrosion resistant metal and had a volume of one liter. It was equipped with an inlet for pressurized $CO_2$, a pressure gauge, and a valve for venting. The vessel had heater bands around its circumference for heating the tubing placed in the interior of the pressure vessel. A small pedestal was present within the vessel, and the tubing to be treated was placed on this pedestal. The vessel was pressurized with the $CO_2$ cold, i.e., the tubing was inside the vessel, but it had not yet been heated. The vessel was heated to the temperature desired and held at that temperature (soak temperature) for one hour, observing the pressure increase with increasing temperature. Because the soaking (maintaining) of the article at peak temperature for this period of time, the temperature of the tubing was at the temperature of the vessel. During this time, the permeation of the supercritical $CO_2$ into the foamable layer and the heating of the layer (and the entire tubing) was uniform. The vessel was depressurized by venting of the $CO_2$, which took about one minute, and then the vessel was allowed to cool for removal of the foamed tubing. Void content of the foamed article was determined by measuring the bulk density of the foamed article by the procedure of ASTM D 792, and dividing this by 2.15 as the true density for all fluoropolymers, except as otherwise indicated, in accordance with the equation:

$$\text{void content (fraction)}=1-\text{bulk density}/2.15$$

Cell size is determined by inspection of magnified cross-sections of the foamed layer.

EXAMPLE 1

In this experiment, the inner layer of the tubing was TEFLON® FEP fluoropolymer resin grade 140J having a melting point of 260° C. The outer layer was TEFLON® PFA fluoropolymer resin grade 350 having a melting point of 305° C. The initial pressuring of the vessel was to 1200 psi (8.3 MPa). The vessel was then heated to 212° C., whereupon the pressure rose to 5000 psi. The pressure was vented to 3800 psi (34.5 Mpa) and then heated (soaked) at 240° C. for one hour, under which condition, the pressure within the vessel was 4200 psi (29 MPa). Venting of the $CO_2$ caused the FEP inner layer to foam to form spherical cells uniformly within the layer, with no visible difference between the top of the tubing and the bottom in terms of disposition within the vessel. These cells were visible in the cross secretion of the tubing at a magnification of 20×. No foaming of the PFA layer was visible. The void content of the foamed FEP layer was about 55% determined in this Example by comparing the thickness of the FEP layer before and after foaming.

EXAMPLE 2

In this experiment, the inner layer was the PFA resin used in Example 1 and the outer layer was a copolymer of tetrafluoroethylene and hexafluoropropylene having a melt melting point of 260° C. The TFE/HFP copolymer contained 0.25 wt % boron nitride, 110 ppm calcium tetraborate, and 180 ppm BaS-10 foam cell nucleating agent. Essentially the same foaming conditions were used in this Example as in Example 1. The TFE/HFP copolymer layer foamed uniformly within the interior of the layer to form spherical cells, which in cross section viewed at 40× magnification, had the appearance of even void content at the top and bottom of the tubing. The void content of the foamed layer was greater than 50%. No voids were visible in the PFA layer. This experiment was repeated except that the FEP had no foam cell nucleating agent, to yield a similar void content but with larger voids.

EXAMPLE 3

Example 2 was repeated (with the same foam cell nucleating agent) except that the PFA resin contained about 3.7 wt % of carbon black to give the tubing antistatic properties and the FEP layer had a void content of greater than 50%; no voids were visible in the PFA layer.

What is claimed is:

1. Process for foaming a composite structure comprising a layer of first fluoropolymer and a substrate in contact with said layer, said layer of first fluoropolymer being solid, said first fluoropolymer being foamable at a temperature at which said substrate is either less foamable or is non-foamable, said process comprising (a) heating said composite structure in which said layer of first fluoropolymer is solid to a foamable state for said first fluoropolymer,
   (b) pressurizing the heated composite structure with supercritical $CO_2$,
   (c) depressurizing the pressurized heated composite structure while said first fluoropolymer is still in the foamable state, whereby said $CO_2$ foams said layer of said first fluoropolymer, and
   (d) cooling said foamed composite structure.

2. Process of claim 1 wherein substrate comprises polymer.

3. Process of claim 2 wherein said polymer is a second fluoropolymer.

4. Process of claim 3 wherein said second fluoropolymer is polytetrafluorethylene.

5. Process of claim 3 wherein said second fluoropolymer is melt-fabricable and additionally forming said composite structure by coextruding said first and second fluoropolymer.

6. The process of claim 1 wherein said composite structure is wire insulation or tubing.

7. Process of claim 6 wherein said layer of first fluoropolymer is on the outside of said wire insulation or tubing.

8. Process of claim 7 wherein prior to said heating or after said cooling, said wire insulation or tubing is overbraid wrapped, whereby the resultant foamed layer of said first fluoropolymer locks said overbraid in place on said insulation or tubing.

9. Process of claim 2 wherein said composite structure is tubing.

10. Process of claim 1 wherein said layer of first fluoropolymer and said substrate are adhered to one another.

* * * * *